United States Patent Office 3,798,312
Patented Mar. 19, 1974

3,798,312
PROCESS FOR PREPARATION OF CHLORINE NITRATE
Donald Pilipovich, Agoura, Calif., and Charles B. Lindahl, Sand Springs, Okla., assignors to the United States of America as represented by the Secretary of the Navy
No Drawing. Filed Sept. 24, 1971, Ser. No. 183,651
Int. Cl. C01b 21/20, 21/52; C01f 11/22
U.S. Cl. 423—386        3 Claims

ABSTRACT OF THE DISCLOSURE

A novel preparation of chlorine nitrate by reacting $FNO_2$ and $Ca(OCl)_2$.

BACKGROUND OF THE INVENTION

(1) Field of the invention

This invention relates to a new method of preparing chlorine nitrate.

(2) Description of the prior art

It is well known that $ClNO_3$ is an important compound which may be used in the synthesis of numerous other inorganic compounds.

Chlorine nitrate has previously been prepared by reaction of either $Cl_2O$ or $ClO_2$ with $NO_2$ or $N_2O_5$, and by reaction of ClF with $HNO_3$ as shown in Pat. No. 3,472,635. The synthesis using the explosive chlorine oxides are associated with a definite hazard potential while the ClF method requires separation of $ClNO_3$ from its by-product HF where the boiling points differ by only a few degrees temperature. In view of such difficulties a new route was sought obviating the use of a halogen fluoride.

SUMMARY OF THE INVENTION

The present concept involves a novel method of preparing chlorine nitrate by reacting nitryl fluoride with calcium hypochlorite. Thus a novel method of preparing chlorine nitrate, a valuable compound from which other inorganic compounds may be prepared, is added to the deficient and unsatisfactory literature on such synthesis.

OBJECTS OF THE INVENTION

Accordingly an object of the invention is to provide a novel process for the preparation of chlorine nitrate.

Another object of the invention is to provide a method for preparing chlorine nitrate which obviates the use of a halogen fluoride.

Still another object is to provide a method for preparing chlorine nitrate which is rapid, convenient and produces chlorine nitrate of high purity.

Other objects, advantages and novel features of the invention will become apparent from the following detailed description of the invention.

DESCRIPTION OF THE PREFERRED EMBODIMENT

This invention comprises a novel process of preparing chlorine nitrate by reacting nitryl fluoride with calcium hypochlorite. The reaction equation is:

$$Ca(OCl)_2 + 2FNO_2 \rightarrow CaF_2 + 3ClNO_3$$

The reaction may occur over a wide variety of reaction temperatures, $FNO_2$ pressures, reactant ratios and $Ca(OCl)_2$ purities. Reactions have produced $ClNO_3$ at temperatures from −78° C. to ambient using both 95% research grade $Ca(OCl)_2$ and 70% grade $Ca(OCl)_2$. Pressures of $FNO_2$ have ranged from 0 at end of the reaction to initial pressures of 120 p.s.i. Reactant ratios have varied from slight excesses of $FNO_2$ to 15 fold excesses of $Ca(OCl)_2$ and reaction times have ranged from less than one hour to about 2 days.

Chlorine nitrate has many utilities but is primarily used as a starting compound for other inorganic compounds including metal nitrates which have established utilities. For example, $Co(NO_3)_2$ and $Mn(NO_3)_2$ are both prepared from $ClNO_3$ and are extensively used to prepare electrodes used in O-depolarized primary cells. Additionally, $Ti(NO_3)_4$ is prepared from $ClNO_3$ which is used in coating and annealing processes for magnetic materials.

EXAMPLE

Two grams of untreated 70% commercial grade $Ca(OCl)_2$ (approximately 10 mmoles of $Ca(OCl)_2$ were placed in an unpassivated 30 ml. stainless steel cylinder. This was evacuated, to remove gaseous substances, and 2.54 mmoles of $FNO_2$ were condensed in at −196° C. The reactor was stored for 44 hours at about −60° C. Subsequent fractional condensation of the sample produced 2.29 mmoles of $ClNO_3$ which gives a 90.2% yield (2.29 mmoles) based on the $FNO_2$ added.

Thus a novel low-cost, one-step $ClNO_3$ preparation is formulated with easy separation of the $ClNO_3$ from the solid $CaF_2$ byproduct.

Obviously, many modifications and variations of the present invention are possible in the light of the above teachings. It is therefore to be understood that within the scope of the appended claims the invention may be practiced otherwise than as specifically described.

We claim:
1. The process for producing $ClNO_3$ which comprises: reacting calcium hypochlorite with nitryl fluoride according to the following equation:

$$Ca(OCl)_2 + 2FNO_2 \rightarrow CaF_2 + 2ClNO_3$$

with the reaction temperature ranging between −78° C. to ambient temperature and separating the $ClNO_3$ from the solid $CaF_2$ by product.

2. The process for producing $ClNO_3$ in claim 1 wherein:
the pressures of $FNO_2$ range from 120 p.s.i. at the beginning of the reaction to 0 p.s.i. at the end of the reaction;
reaction ratios vary from slight excesses of $FNO_2$ to 15 fold excesses of $Ca(OCl)_2$; and
reaction times range from about one hour to about two days.

3. The process for producing $ClNO_3$ which comprises: placing 10 mmoles of $Ca(OCl_2)_2$ in a reactor cylinder; evacuating said cylinder to remove gaseous substances; condensing 2.54 mmoles of $FNO_2$ in said reactor cylinder at −196° C.;
holding the reactor cylinder for 44 hours at about −60° C.;
wherein subsequent fractionation produced 2.29 mmoles of $ClNO_3$.

References Cited

UNITED STATES PATENTS 3,472,635  10/1969  Schack.

OSCAR R. VERTIZ, Primary Examiner
H. S. MILLER, Assistant Examiner

U.S. Cl. X.R.

423—490